Jan. 21, 1964 N. HOGLUND 3,118,344
GEAR CUTTING APPARATUS
Filed April 25, 1958 10 Sheets-Sheet 1

INVENTOR
NILS HOGLUND.
BY
William A. Zaluak
ATTORNEY

Jan. 21, 1964   N. HOGLUND   3,118,344
GEAR CUTTING APPARATUS
Filed April 25, 1958   10 Sheets-Sheet 7

Fig. 10.

INVENTOR
NILS HOGLUND
BY
William A. Palesak
ATTORNEY

Jan. 21, 1964   N. HOGLUND   3,118,344
GEAR CUTTING APPARATUS
Filed April 25, 1958   10 Sheets-Sheet 9

INVENTOR
NILS HOGLUND
BY
William G. Galesak
ATTORNEY

INVENTOR.
NILS HOGLUND
BY
William A. Zalesak
ATTORNEY

United States Patent Office 3,118,344
Patented Jan. 21, 1964

3,118,344
GEAR CUTTING APPARATUS
Nils Hoglund, 7 Webster Ave., Summit, N.J.
Filed Apr. 25, 1958, Ser. No. 730,891
14 Claims. (Cl. 90—9.4)

My invention relates broadly to couplings and apparatus for forming coupling elements on driving and driven members wherein the contacting surfaces of said coupling elements lie along cycloidal curves and wherein the elements extend from the rotating members of the couplings and parallel to the axis of rotation of said members.

In one application, a coupling is required for connecting turbine wheels and spacers in the axial compressor of gas turbines where the splines, that is, the coupling elements, have to be cut very close to an interfering surface. For example, the coupling was to be located within 1/3" of the inside of the dovetail form on the periphery of the turbine wheel. In this arrangement, the dovetail is a flange extending around the periphery of the turbine wheel and forms a protrusion at the edge of the wheel. This makes it impossible to use conventional equipment to machine teeth or splines so close to the dovetail form or flange on the turbine wheel.

In addition, the coupling teeth or splines must have a form that will satisfy several requirements. These are:
(1) The tooth form must be extremely accurate;
(2) the teeth must be economically machined;
(3) the teeth must have the ability to centralize (that is, bring to a common center) the two members of the coupling when under force. In other words, the coupling should have the characteristic found in an involute spline which tends, under load, to find a common center; and
(4) the coupling should have approximately 85% contact when assembled.

An object of my invention is to provide an improved apparatus for forming coupling teeth on coupling members having the characteristics pointed out above.

A further object of my invention is to provide an apparatus capable of forming teeth on driving and driven members of a coupling and having complementary forms and in which the contacting surfaces of the teeth lie along cycloidal curves more particularly prolate hypocycloid curves.

A still further object is to provide such an apparatus which is capable of forming coupling teeth close to a rim forming an obstruction to the movement of the cutting tool for forming the teeth.

A further object of my invention is to provide such an apparatus in which the infeeding of the cutting tool during formation of the teeth is automatically controlled.

A coupling made by apparatus made according to my invention includes a pair of engaging members, a driving and a driven member, movable axially into engagement. One of said members includes a disc having a dovetailed shaped rim and having coupling teeth lying along a circle closely adjacent the rim, the teeth extending normally of the disc and parallel to the rim. The teeth have a depth less than that of the rim and the engaging sides or surfaces of the teeth lie along cycloidal curves and extend normally of the surface of the disc. The other of the coupling members includes a ring or drum-like member having a rim provided with an inturned flange upon which are formed complementary teeth extending toward and engaging the teeth on said disc. Because of their form, these teeth are locked in by the teeth on the disc. I show several forms.

Apparatus made according to my invention includes a base having a support for a coupling member or work piece to be worked on and an upright or vertical support for the cutting apparatus assembly. A slide is mounted on the vertical support and has screw means for vernier vertical adjustment.

A housing in the form of an annular supporting member is mounted on a second slide movable on said vertical support. This last slide is connected to a cylinder in turn supported on its piston rod fixed to the first slide. A spindle mounted in said annular supporting member and whose axis of rotation coincides with the axis of rotation of the coupling member to be worked on has mounted thereon and off center a stud rotatably supporting a cutting plate assembly on which is supported a plurality of cutting tools. The housing has mounted at its lower end an internal gear which is meshed to a pinion gear attached to the cutter plate. The spindle is driven by a motor and as it rotates the stud and cutter plate about the spindle axis, the cutter plate is made to rotate about the off-center stud causing the cutting tools to move along cycloidal paths across the tooth ring on the coupling member to form the teeth. Automatically controlled hydraulic means moves the slide and tool assembly by small increments to feed the cutting tool assembly toward the work piece as the teeth are being formed.

As the cutter tool, which is mounted in a slidable support spring pressed away from the work piece, moves across the tooth ring, a cam on the spindle assembly contacts a cam follower on the tool support to press the tool support toward the work piece in its cutting pass. As the tool moves out past the rim of the coupling member, the tool moves back to clear the dovetail rim.

At the top of the housing is a switch mechanism which is set so that after being tripped a predetermined number of times, controls circuits and other mechanism for causing infeeding of the tool assembly supporting slide for the next increment cut. Other limiting mechanism limits the infeeding and rapid retraction of the housing away from the work piece.

The invention will be described with reference to the accompanying drawings in which.

One of the principal problems as pointed out above in connection with couplings of the kind under consideration, is to maintain engagement between the driving and driven teeth of a disc and a spacer where high speed rotation is involved. That is, the teeth must be locked against relative radial movement and separation during operation.

Figure 1:
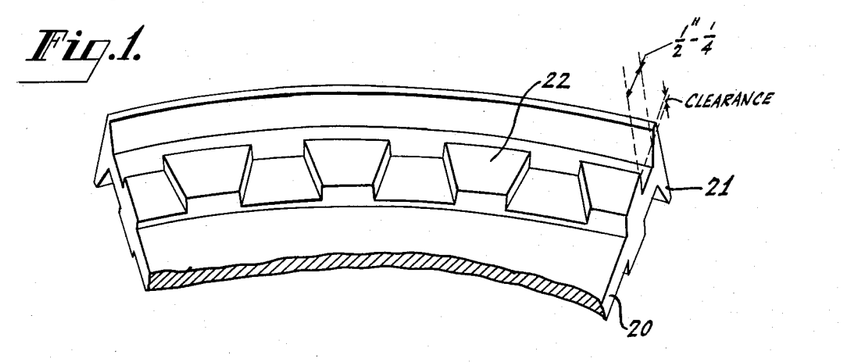
FIGURE 1 is a partial perspective of the female portion of a coupling made by apparatus made according to my invention comprising the turbine disc.
Figures 2, 3:
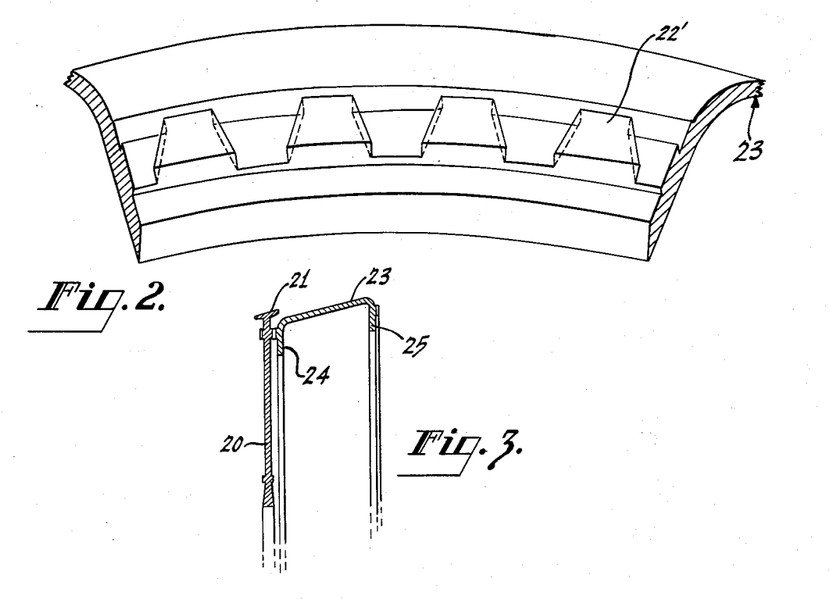
FIGURE 2 is a partial perspective of the male part of the coupling or the turbine spacer.
FIGURE 3 is a partial section of the two coupling members in coupling relationship.
Figure 4:
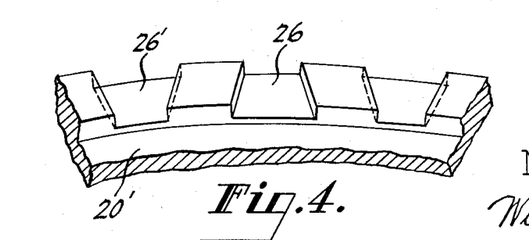
FIGURE 4 is a perspective showing a modified tooth formation in a turbine disc.

Referring now to FIGURES 1, 2 and 3, a plain cycloid coupling useful in turbines includes the female disc member 20 shown in FIGURE 1. It is provided with a rim 21 of dovetail formation. Lying in a circle and closely spaced from the rim are the coupling teeth 22, the outer extremities of which are spaced a distance of ¼" to ½" from the rim 21. It will be noted that the rim 21 extends normally further from the disc than the teeth as shown by the dotted lines and thus that any cutting tool for forming these teeth must be lifted on moving out of or into the tooth circle to clear this rim. In FIGURES 2 and 3, I show the male coupling member 23, which is in the form of a tapered ring having inwardly extending flanges 24 and 25. Teeth 22' are formed on rim 24 and are formed to be complementary to the teeth 22 on the disc. In FIGURE 4, I show a modification of the disc 20' where alternate teeth 26 and 26' are inclined to each other so that when engaged with complementary teeth on the male coupling member, the teeth are locked in two directions.

Figure 5:
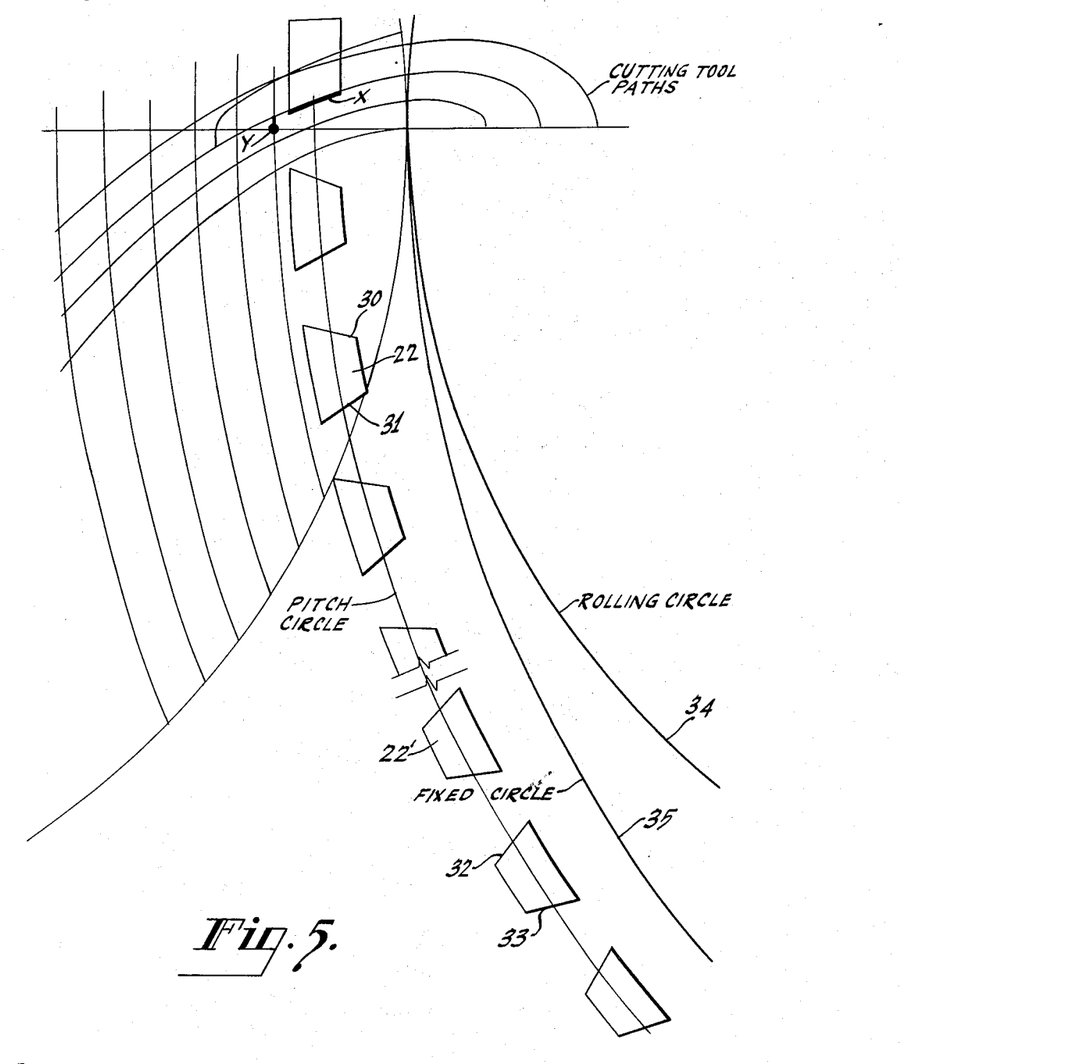
FIGURE 5 is a diagram showing the tooth development curves used in making the teeth on the coupling members.

The configuration which I have found to be most satisfactory for the coupling teeth is that of a prolate hypocycloid curve. The development of such a tooth profile is shown in FIGURE 5. The path of the cutting point must move across the tooth circle both from the inside out and from the outside in. If the fixed circle of the rolling circle lies inside the pitch circle of the teeth to be formed, the cutting tool must be supported in such a way as to have movement along the path described. That is, the cutter must be mounted on a rotatable support that revolves about an axis in turn revolving around the axis or center of the tooth or pitch axis, and must move across the tooth circle.

The teeth 22 on the female member and the teeth 22' on the male member have engaging surfaces 30, 31 and 32, 33 lying along a cycloid path generated by a point lying outside the rolling circle 34 rolling on the fixed circle 35. The path X shows the path of the point and the shape of the contour as well as the path of the cutting tool. Since the rolling circle is rolling internally of the directing or fixed circle, a hypocycloid path is generated. In a preferred form the rolling circle has a ratio of 56:37 to the fixed circle resulting in substantially straight sides for the teeth.

Apparatus made according to my invention which is capable of moving a cutting tool along the paths described above is shown in the remainder of the figures of the drawing.

APPARATUS

Figure 6:
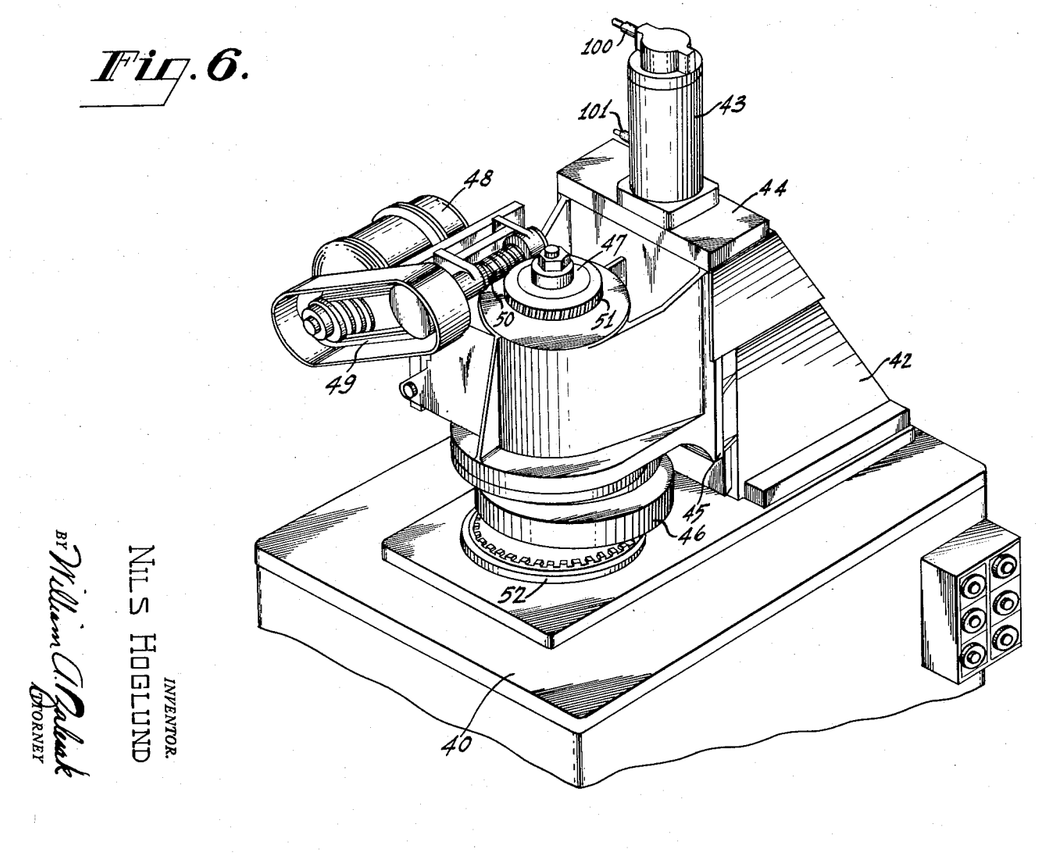
FIGURE 6 is a perspective showing apparatus made according to my invention.
Figure 7:
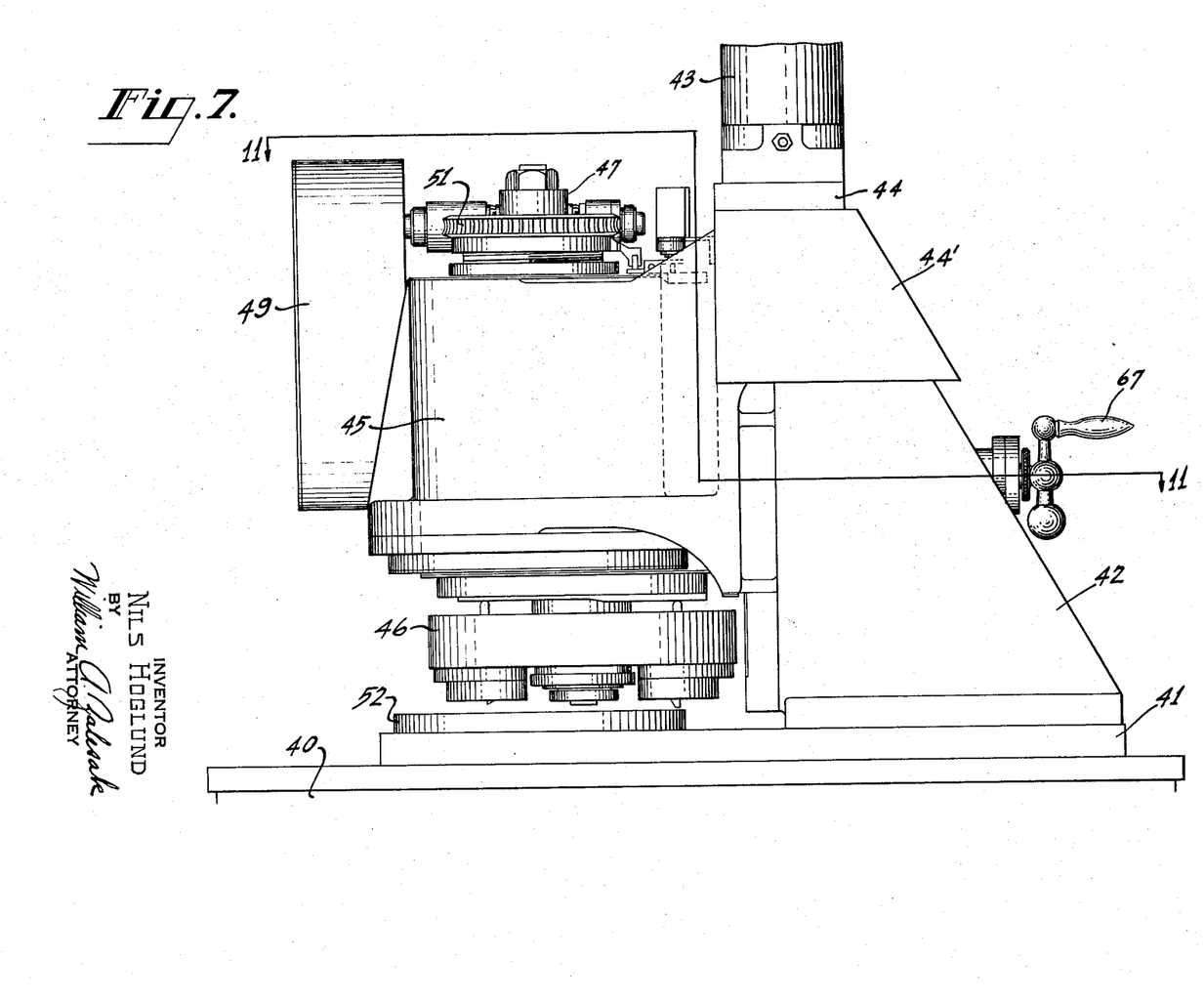
FIGURE 7 is a side elevation of the apparatus shown in FIGURE 6.
Figure 8:
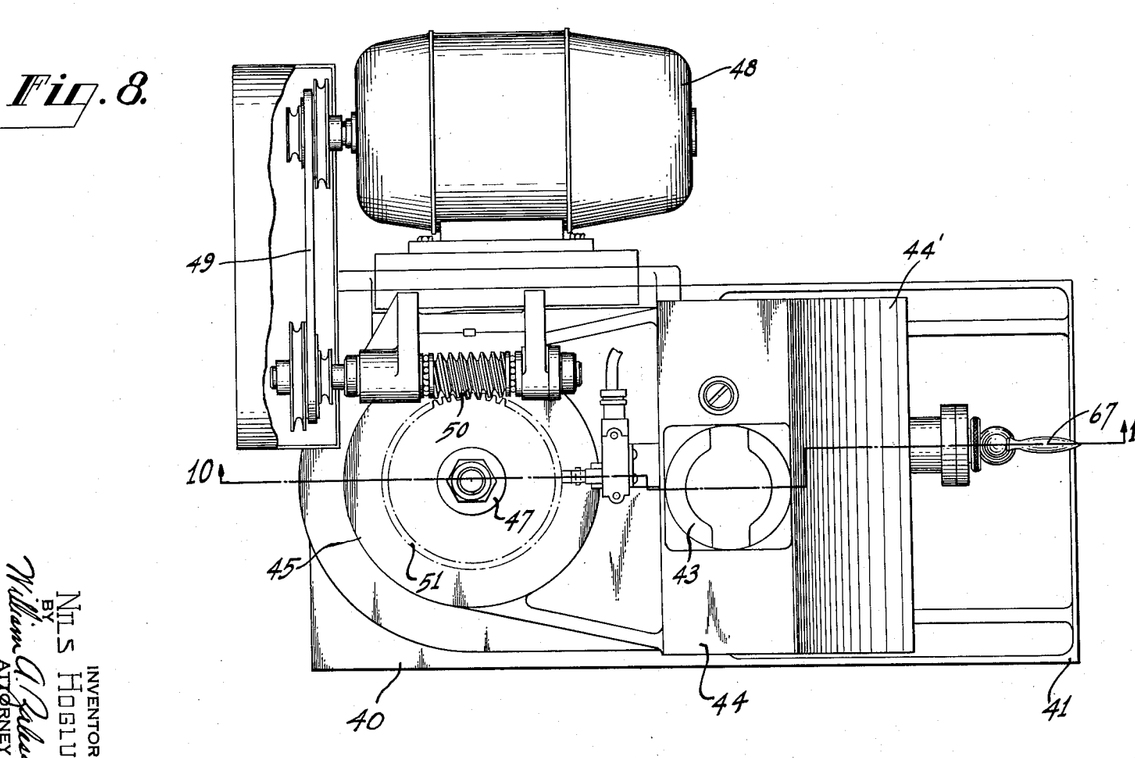
FIGURE 8 is a plan view of FIGURE 7.
Figure 9:
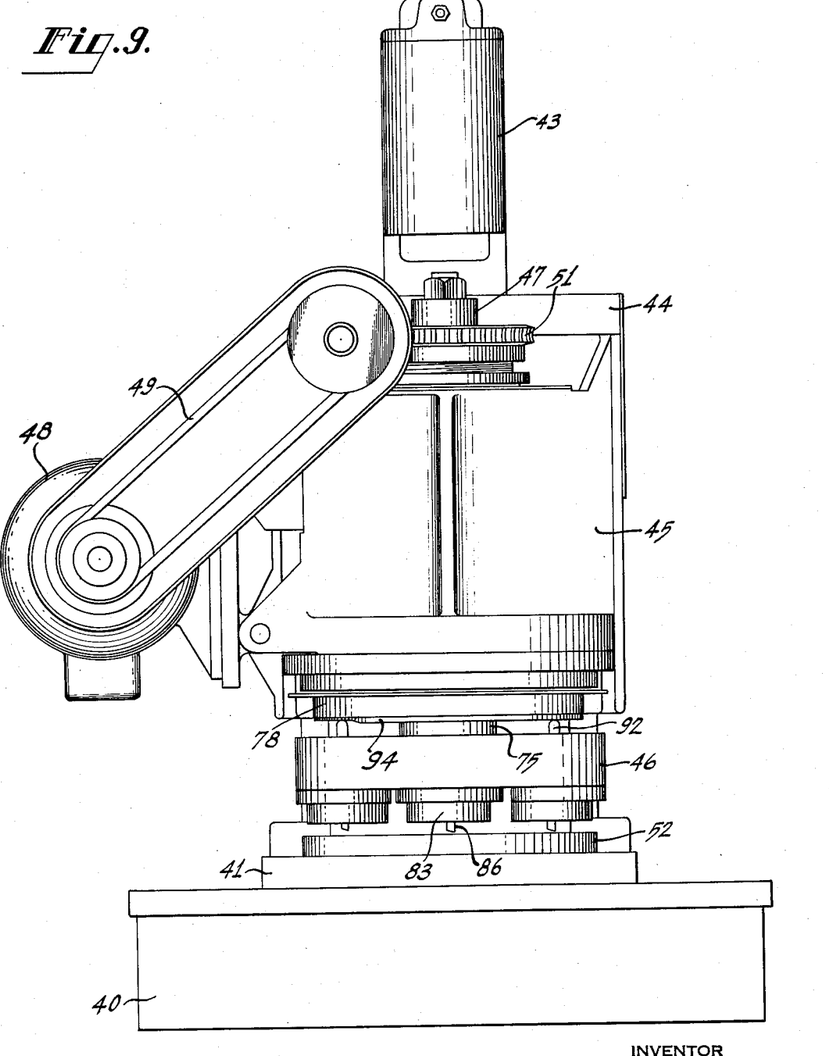
FIGURE 9 is an end view of FIGURE 7.

In FIGURE 6, the supporting table 40 has mounted thereon a base 41 on which in turn is mounted the upright support 42. This upright support has mounted therein a vertically moving slide which is adjustable and which will be described below. This slide supports a fixed piston and rod to be described and the movable cylinder 43 supporting a plate 44 having a shield 44' and to which the housing 45 is fastened and which rotatably supports the rotating tool support 46 mounted on a rotating spindle 47 mounted in the housing 45 and driven by motor 48 by the pulley and belt assembly 49 by means of gears 50, 51. The tool support can be advanced toward the coupling and work piece 52 supported on the base 41 as the teeth on the coupling are being cut.

Figure 10:
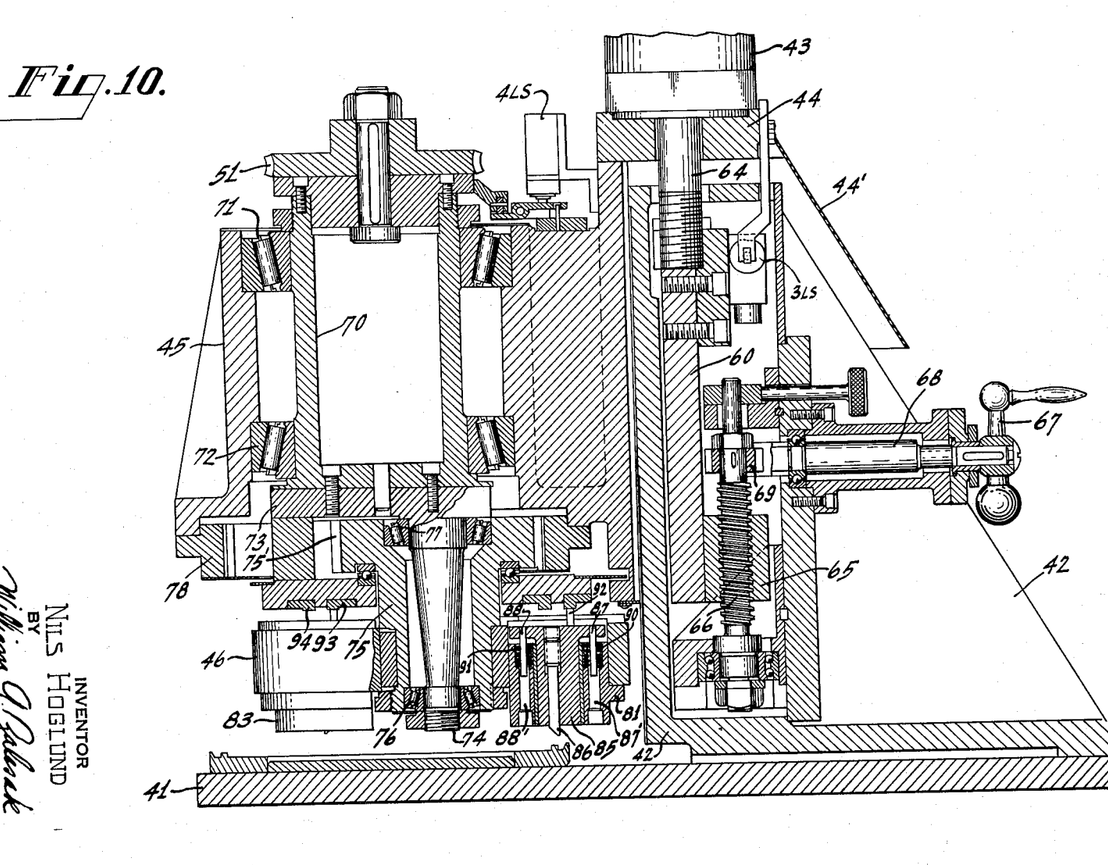
FIGURE 10 is a vertical section taken along the line 10—10 of FIGURE 8.
Figure 11:
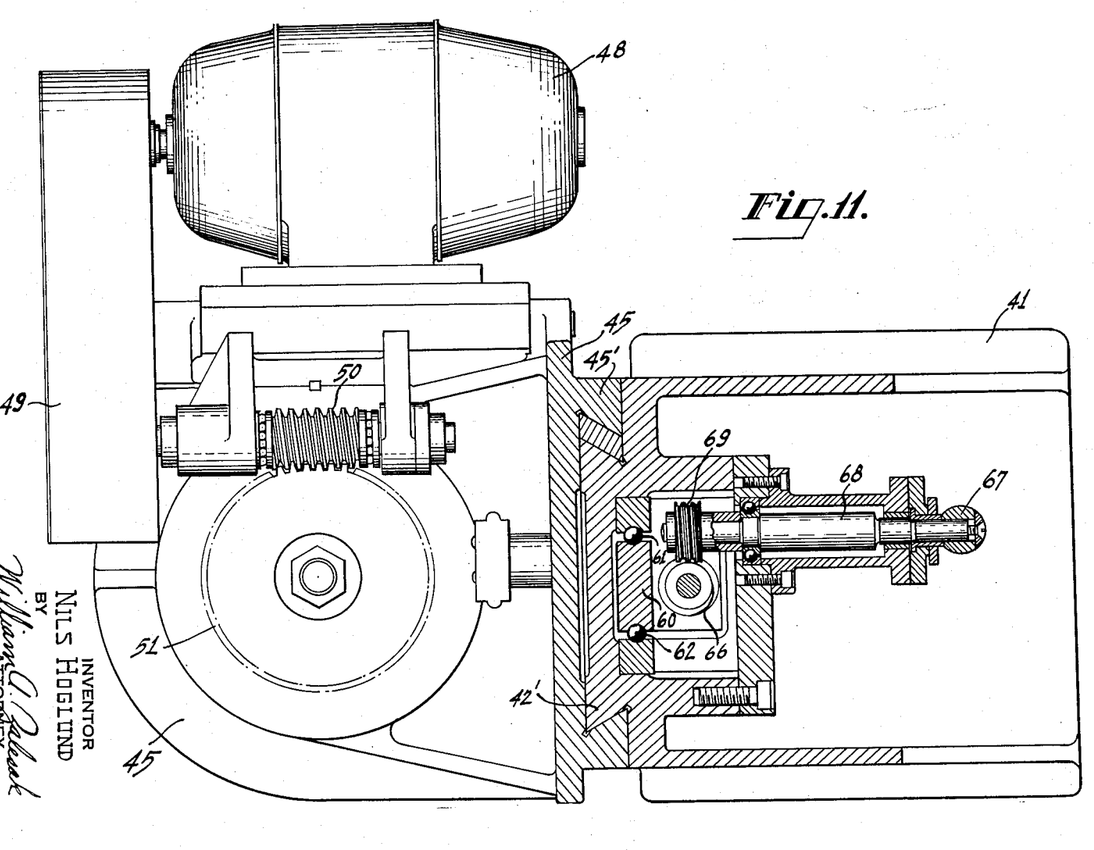
FIGURE 11 is a section taken along the line 11—11 of FIGURE 7.

Referring now to FIGURES 10 and 11, mounted within the vertical support housing 42 by means of the ball bearing assemblies 61, 62 is a slide 60. Attached to the upper end of the slide 60 is the piston rod 64 having a piston enclosed within the cylinder 43. The plate 44 is attached to the housing 45, which is slidably mounted on the upright or slide portion 42' of the support 42 by means of the slide portion 45'.

To adjust the position of the slide and housing 45 prior to cutting operations, I provide the slide with the extension nut 65 which receives the rotatable screw 66 which may be rotated by crank 67 through shaft 68 and the helical gears 69. When crank 67 is rotated the worm gear 66 is rotated moving slide 60 up or down. This arrangement is primarily for initial adjustment and not for feeding during operation.

Within the supporting housing 45 I rotatably mount the spindle assembly comprising the tubular spindle member 70 supported in the roller bearings 71, 72. Secured to the lower end of the spindle 70 is a plate 73 having thereon a stud 74 in the form of an axle which rotatably supports the tool plate 46, by means of the tubular member 75 provided at its upper end with the pinion gear 75'; the bearings 76 and 77 helping to support the tool plate 46. The lower end of the housing 45 supports the internal ring gear 78 which meshes with the pinion gear 75'. Thus, as the spindle 70 is rotated about its axis by motor 48, the stud 74 is rotated in a circle around this axis and the axis or center of the coupling member. Since ring gear 78 is fixed, pinion 75' rotates rotating the cutter tool plate 46, carrying the cutting tools.

Figures 12, 14:
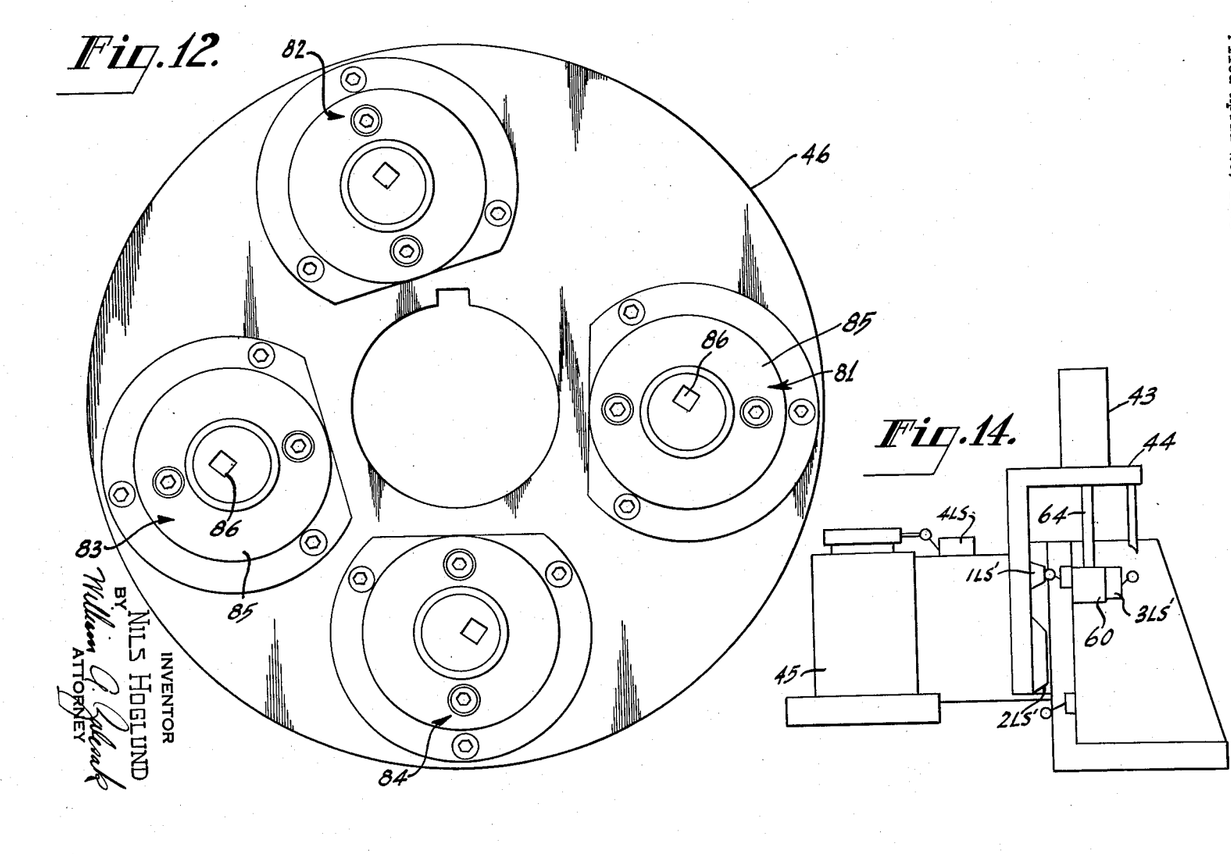
FIGURE 12 is a bottom view of the cutter plate.
FIGURE 14 is a schematic diagram of the apparatus of FIGURE 6 showing the position of the control switches.

Referring now to FIGURES 10 and 12, the plate 46 carries form cutting tool assemblies 81, 82, 83 and 84. Each of these assemblies includes a slidable tool support 85 carrying a cutting tool 86. The slide 85 is provided with pins 87, 88 received within the chambers 87' and 88' in the tool slide support 81 on the cutter plate support 46. Springs 90, 91 spring press the tool slide 85 upwardly and away from the work piece 52. The tool slide assemblies carry a cam follower 92 which cooperate with either cam 93 or 94 to move the tool slides against biasing springs 90 and 91 when the cutting tools pass over the tooth circle to feed the tools to form the teeth either from the outside in or inside out.

CONTROLS

Figure 13:
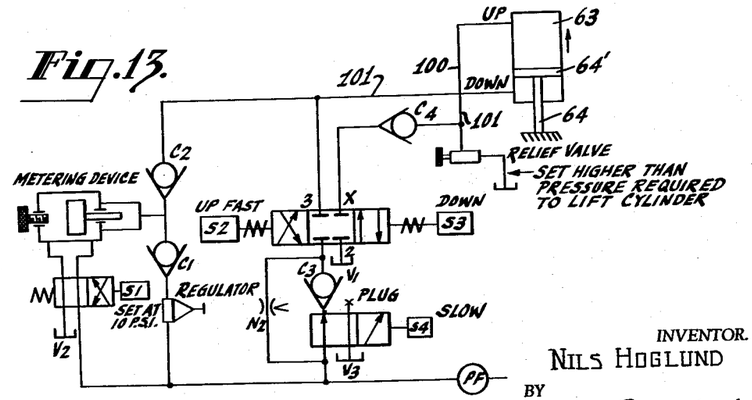
FIGURE 13 is a schematic diagram of the valve system used to control the infeeding of the tool assembly supporting slide.
Figure 15:
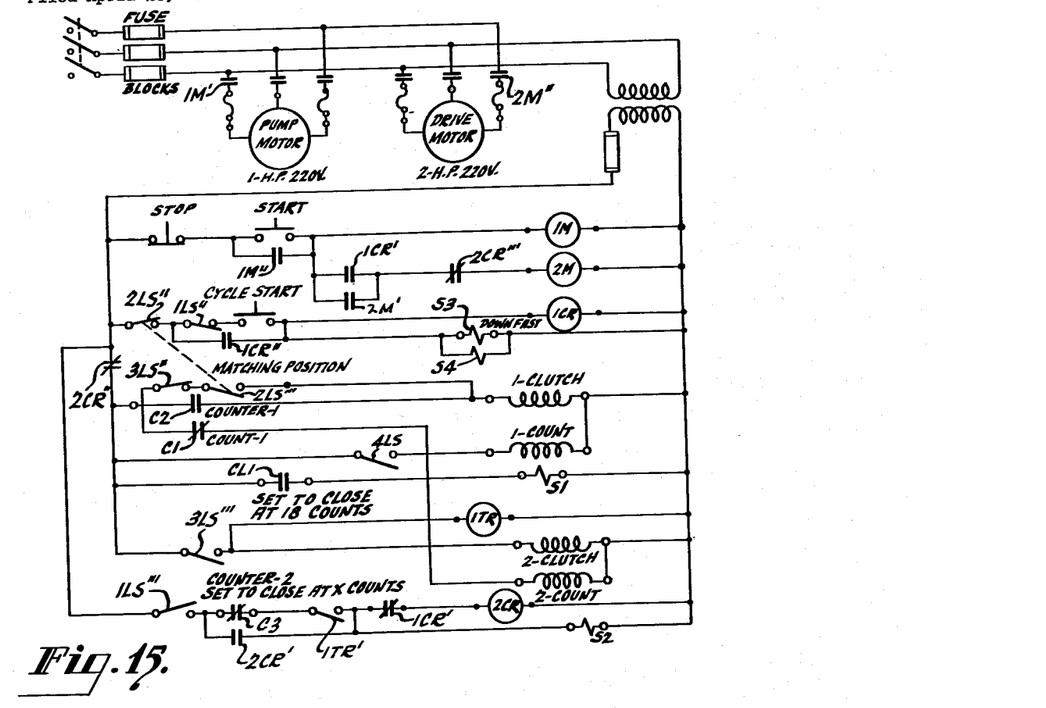
FIGURE 15 is a wiring diagram of the control system used with my apparatus.

Referring to FIGURES 13, 14 and 15, with slide 44 in its uppermost position retracted from the work piece, cam 1LS' is in contact with the tripper on switch 1LS closing contact 1LS" in the circuit to be described to ready the circuit for moving slide 44 rapidly downward. The cam 1LS' is carried on the slide. Contact 1LS''' in the 2CR circuit is open.

Switch 2LS operated by cam 2LS' and which is a double contact switch has the contact 2LS" closed through the "Cycle Start" circuit and the other contact 2LS''' in the "Machining Position" circuit open. In this position, cam 2LS' is not in contact with the tripper of switch 2LS.

Switch 3LS, another double acting switch which is out of contact with cam 3LS' has its contact 3LS" in the "Machining Position" circuit closed and its contact 3LS''' in the circuit of counter No. 2 open.

In FIGURE 13, the arrows indicate the direction of flow of the fluid when the various coils are energized. The excess fluid is bypassed into the tank when the valves are operated to permit this flow.

When "Start" button is pushed, relay 1M becomes energized. Contacts 1M' are closed. This circuit energizes the Pump Motor. When 1M is energized, contact 1M" is also closed forming a holding circuit for relay 1M. When "Cycle Start" button is pressed, relay 1CR becomes energized closing contact 1CR' and energizing relay 2M. Contact 2M' is closed forming a holding circuit for relay 2M. Contacts 2M" are closed. This starts the Drive Motor for the spindle.

When contact 1CR" closes, the two coils S3 and S4 become energized giving the cylinder a fast down movement. This fast down movement (fast restricted) is accomplished by having S4 blocking the flow through valve V3 and thereby restricting the flow through restricting valve N2. S3 shifts the spool in V1 so that the flow goes from 1 to 3 of valve V1 and fluid in the top of cylinder 43 returns to the tank. This will now cause the cylinder to move down at a high rate (with some restriction through valve N2).

When the slide 44 has reached its work start position, that is, its machining position, switch 2LS is operated by a cam 2LS' on the slide. Contact 2LS" is opened. This de-energizes 1CR. S3 and S4 are de-energized. The flow of fluid under pressure into the cylinder ceases by blocking all parts on valve V1.

2LS'" (limit switch in the "Machining Position" of the slide) is now closed. Since contact 3LS" is closed, a pulse will go through 4LS each revolution of the cutter, and which is tripped each revolution of the spindle through counter switch C1, limit switch 3LS" and clutch coil L1 and counter coil 1. Counter contact C2 is closed and contact C1 opened. This starts a counting as each time the spindle of the machine rotates 4LS is closed momentarily energizing the counter coil on counter #1. When the correct number of counts is reached, contact C2 drops out and contact C1 closes again starting the circuit over for a new count as just has been described.

For each time the clutch coil is energized, the contacts CL1 close energizing solenoid coil S1 on valve V2. This will cause the piston in the Metering Device to move to the right forcing a small amount of hydraulic fluid into the cylinder moving the slide 44 of the machine down .002" each time the counter clutch becomes energized. During the short interval that S1 is de-energized, the piston in the "Metering Device" is shifted to the left causing a low pressure flow through the pressure regulator pass check valve C1.

When the slide has been fed down to the lowest limit, Limit Switch 3LS is actuated by cam 3LS' on the slide 44. This opens up contact 3LS" thus disengaging the clutch and #1 counter coil. Contact 3LS'" is closed. The #2 clutch coil is energized. 4LS gives impulses which now are counted by counter #2. Each time an impulse comes through 4LS, counter coil #2 becomes momentarily energized. This continues until the predetermined number has been counted.

When the counting is completed, the contacts C3 which were normally closed but opened when #2 clutch and #2 counter were energized, are closed. Contacts 1TR are closed a short time after the #2 clutch of counter #2 becomes energized since 1TR (timer coil) is in parallel with the #2 counter clutch coil and was energized when 3LS'" was closed. 1LS'" is closed at this time therefore 2CR becomes energized and is locked in through contacts 2CR'. Solenoid S2 on valve V1 becomes energized.

Contacts 2CR" normally closed in one side of the line and 2CR'" controlling relay 2 are opened, stopping the cutter motor from operating and all counters from operating. This shifts the spool on valve V2 so that there is a free flow of the full pressure to the upper side of the cylinder 43 moving the slide 44 up at highest speed possible.

When the slide 44 reaches the top, Limit Switch 1LS opens contact 1LS'" de-energizing 2CR and also solenoid coil S2. The whole process is now completed and the machine is ready to reload and is then started to operate again by pushing the "Cycle Start" button.

What is claimed is:

1. Apparatus for forming coupling teeth on a coupling member including a stationary work piece support, a tool assembly support for supporting a cutting tool assembly adjacent said work piece support and for advancing said tool assembly toward said work piece support parallel to the axis of rotation of said coupling member, a slide on said tool assembly support, a housing on said tool slide including an annular supporting member, a spindle assembly supported within said annular supporting member, a support mounted off center on said spindle assembly, a rotatable cutting tool plate mounted on said support, means on said housing and said rotatable tool plate in contact with each other for causing relative rotation of said cutting tool plate and its support, means for driving said spindle, and other means for advancing said slide and tool assembly toward said work piece support, control means operated by movement of said tool assembly for controlling movement of said tool assembly, tools slidably mounted on said tool plate and means on said tool assembly for causing movement of said tools relative to said tool plate at predetermined times during rotation of said tool plate.

2. Apparatus for cutting teeth in a planar coupling member having teeth extending normally thereto and including a supporting structure, a work supporting member on said supporting structure, a rotatable supporting member slidably mounted on said supporting structure to move toward and from said work supporting member, a supporting member mounted off center of the axis of rotation of and on said rotatable supporting member, a rotatable tool supporting member mounted on said last supporting member, a cutting tool slidably mounted on said rotatable tool supporting member to move outside the periphery of the circle defining the pitch line of the teeth in said coupling member whereby upon rotation of said rotatable supporting member, said tool will move along a cycloidal path and through the circles defining the top and base of the teeth to be cut on said planar coupling member, and means adjacent said rotatable tool supporting member for causing movement of said tool relative to said tool supporting member at predetermined times during rotation of said tool supporting member.

3. Apparatus for forming gear teeth on a coupling member, said gear teeth extending parallel to the axis of rotation of said member and including a housing, said apparatus including a slide, said housing being mounted on said slide for movement toward a coupling member being worked on, an internal ring gear fixed to said housing, a rotatable supporting member mounted within said housing, a cutting tool slidably mounted off axis on said rotatable supporting member, said cutting tool following a cycloidal path for cutting gear teeth when said rotatable supporting member is rotated, and means connected to said slide for advancing said slide by increments toward a coupling member being worked on, control means operated by movement of said housing for controlling movement of said cutting tool and said rotatable supporting member, and means adjacent the rotatable tool supporting member for causing movement of said tool relative to said rotatable supporting member at predetermined times during rotation of said rotatable supporting member.

4. Apparatus for cutting teeth in a planar coupling member having teeth extending normally thereto and including work supporting member, a housing movable toward and from said work supporting member having an internal ring gear having internal teeth, a relatively rotatable tool supporting member mounted in said housing and meshed with said gear, a cutting tool slidably mounted on said tool supporting member, said tool being mounted on said tool supporting member to move outside the periphery of the circles defining the base and top of the teeth in said coupling whereby rotation of said rotatable tool supporting member will cause said cutting tool to move along a cycloidal path and through the circles defining the top and base of the teeth to be cut on said planar coupling member, and means adjacent said tool supporting member for causing movement of said tool relative to said tool supporting member at predetermined times during rotation of said tool supporting member.

5. Apparatus for cutting dovetail teeth in a coupling member having teeth extending parallel to the axis of rotation of said member, and including a fixed work supporting member, a support, a slide slidably mounted on said support, a housing on said slide, and means for moving said slide, an internal ring gear having internal teeth mounted on said housing, a rotatable tool supporting member mounted in said housing and having a pinion gear meshed with said gear, a cutting tool mounted on said rotatable tool supporting member, said tool being mounted off center on said rotatable tool supporting member to move outside the periphery of the circles defining the top and base of the teeth to be formed on said coupling member whereby rotation of said rotatable tool supporting member will move said cutting tool along cycloidal paths and through the circles defining the top and base of the teeth to be cut on said coupling member, a hydraulically operated mechanism connected to said housing for advancing said housing and tool supporting member toward said fixed work supporting member, and control means operated by movement of said tool assembly for controlling movement of said housing and tool.

6. Apparatus for forming coupling member teeth on a pair of meshing members including a base, a work supporting member mounted on said base, a vertical support mounted on said base, a slide mounted on said vertical support, means for adjusting said slide on said support, means including a hydraulically operated cylinder including a piston rod fixed to said slide, a support on said cylinder, a housing on said last support, a spindle assembly mounted for rotation in said housing, a stud on said spindle assembly mounted off center of the axis of rotation of said spindle assembly, a cutter plate assembly rotatably mounted on said stud, a cutter tool on said plate, and gear means connected between said housing and said cutter plate for causing rotation of said cutter plate when said spindle is rotated, means for driving said spindle, and control means mounted on said housing and said slide for controlling the flow of fluid under pressure to said cylinder for moving said slide by increments, said control means being operated by movement of said housing.

7. Apparatus for forming coupling teeth on a pair of meshing members including a work piece support, a tool assembly support supporting a cutting tool assembly above said work piece and advancing said tool assembly toward said work piece, including a housing having an annular supporting member mounted on said tool assembly support, a spindle assembly supported within said annular support member, a stud mounted off-center on said spindle assembly, a rotatable cutting tool plate mounted on said stud, a ring gear mounted on said housing, said rotatable tool plate having a pinion gear rotating within and meshed with said ring gear, means for driving said spindle, other means for advancing said tool plate and tool assembly toward said work piece and control means operated by movement of said tool assembly for controlling movement of said tool assembly, tools slidably mounted on said tool assembly, and means on said tool assembly for causing movement of said tools relative to said tool plate at predetermined times during rotation of said tool plate.

8. Apparatus for forming coupling teeth on a pair of meshing members including a work piece support, the work piece having tooth portions extending parallel to the axis of rotation of said work piece during operation, said apparatus including a tool assembly support for supporting a cutting tool assembly above said work piece and advancing said tool assembly toward said work piece, said tool assembly including a housing having an annular supporting member mounted on said tool assembly support, a spindle assembly supported within said annular support member, a stud mounted off-center on said spindle assembly, a rotatable cutting tool plate mounted on said stud, a ring gear mounted on said housing, said rotatable tool plate having a pinion gear rotating within and meshed with said ring gear, means for driving said spindle, other means for advancing said tool plate and tool assembly toward said work piece and control means operated by movement of said tool assembly for controlling movement of said tool assembly, a tool slidably mounted on said tool assembly, and means on said tool assembly for causing movement of said tool relative to said tool plate at predetermined times during rotation of said tool plate.

9. Apparatus for forming coupling teeth on a pair of meshing members including a work piece support, a tool assembly support for supporting a cutting tool assembly above said work piece and advancing said tool assembly toward said work piece, including a housing having an annular supporting member mounted on said tool assembly support, a spindle assembly supported within said annular support member, a rotatable cutting tool plate mounted off-center on said spindle, a ring gear mounted on said housing, said rotatable tool plate having a pinion gear rotating within and meshed with said ring gear, means for driving said spindle, other means for advancing said tool plate and tool assembly toward said work piece, control means operated by movement of said tool assembly for controlling movement of said tool assembly, tools slidably mounted on said tool assembly, and means on said tool assembly for causing movement of said tools toward and away from said work piece at predetermined times during rotation of said tool plate.

10. Apparatus for forming coupling teeth on a pair of meshing members including a work piece support, a tool assembly support for supporting a cutting tool assembly above said work piece and advancing said tool assembly toward said work piece including a slide, a housing having an annular supporting member mounted on said slide, a spindle assembly supported within said annular support member, a rotatable cutting tool plate mounted off-center on said spindle, a ring gear mounted on said housing, said rotatable tool plate having a pinion gear rotating within and meshed with said ring gear, means for driving said spindle, means connected to said slide for advancing said tool plate and tool assembly toward said work piece, control means operated by movement of said tool assembly for controlling movement of said slide, tools slidably mounted on said tool assembly, and means on said tool assembly for causing movement of said tools relative to said tool plate at predetermined times during rotation of said tool plate.

11. Apparatus for forming coupling teeth on a pair of meshing members including a work piece support, a tool assembly support supporting a cutting tool assembly adjacent said work piece support and for advancing said tool assembly toward said work piece support including a housing having an annular supporting member mounted on said tool assembly support, a spindle assembly supported within said annular support member, a stud mounted off-center on said spindle assembly, a rotatable cutting tool plate mounted on said stud, a ring gear mounted on said housing, said rotatable tool plate having a pinion gear rotated within and meshed within said ring gear, means for driving said spindle, means for advancing said tool plate and tool assembly toward said work piece supports and control means operated by movement of said tool assembly for controlling movement of said tool assembly, tools slidably mounted on said tool plate and means on said tool assembly for causing movement of said tools relative to said tool plate at predetermined times during rotation of said tool plate.

12. Apparatus for forming coupling teeth on a pair of meshing members including a work piece support, a tool assembly support supporting a cutting tool assembly adjacent said work piece support and for advancing said tool assembly toward said work piece support including a housing having an annular supporting member mounted on said tool assembly support, a spindle assembly supported within said annular support member, a stud mounted off-center on said spindle assembly, a rotatable cutting tool plate mounted on said stud, a ring gear mounted on said housing, said rotatable tool plate having a pinion gear rotated within and meshed within said ring gear, means for driving said spindle for advancing said tool plate and tool assembly toward said work piece supports, tools slidably mounted on said tool plate and means on said tool assembly for causing movement of said tools relative to said tool plate at predetermined times during rotation of said tool plate.

13. Apparatus for forming coupling teeth on a pair of meshing members including a work piece supporting member, a tool assembly support for slidably supporting a cutting tool assembly adjacent said work piece supporting member, means for advancing said tool assembly toward said work piece including a slide, a housing mounted on said slide and having an annular supporting member, a spindle assembly supported within said annular support member, a rotatable cutting tool plate mounted off-center on said spindle, a ring gear mounted on said housing, said rotatable tool plate having a pinion gear rotated within and meshed with said ring gear means for driving said spindle, hydraulic means connected to said slide for advancing said tool assembly toward said work supporting member, control means operated by movement of said tool assembly for controlling movement of said slide, means on said tool plate slidably supporting a plurality of tools thereon, means for biasing said last means away from said work piece supporting member and cam means mounted on said tool assembly for co-operating with said last means for causing movement of said tools relative to said tool plate at predetermined times during rotation of said tool plate.

14. Apparatus for forming coupling teeth on a pair of meshing members including a stationary work piece support, said work piece having tooth portions extending parallel to the axis of rotation of said work piece during operation, a support for supporting a tool assembly adjacent said work piece support including a slide, means connected to said slide for adjusting the position thereof relative to the work piece support, a hydraulically operated piston having a piston rod connected to said slide, a second slide, said piston being connected to said second slide for moving said second slide, a housing mounted on said second slide, an annular member supporting on said housing, a rotatable member rotatably mounted in said annular member, a stud on said rotatable member mounted off-axis with respect to said rotatable member, a rotatable cutting tool plate mounted on said stud means on said housing and said rotatable plate in contact with each other for causing rotation of said cutting tool plate and its support, slidable means spaced around said tool plate and supporting cutting tools, means for biasing said cutting tools away from said work supporting member and means on said housing including cams cooperating with said slidable means for causing movement of said tool and tool supports away from said work piece supporting member at predetermined times during rotation of said tool plate, control means associated with said tool assembly and said hydraulically operated piston and controlled by movement of said tool assembly for causing incremental movement of said tool assembly toward said work piece supporting member.

References Cited in the file of this patent

UNITED STATES PATENTS

| | | |
|---|---|---|
| 1,625,402 | Sloan | Apr. 19, 1927 |
| 2,139,154 | Galloway | Dec. 6, 1938 |
| 2,405,171 | Wildhaber | Aug. 6, 1946 |
| 2,558,203 | Wildhaber | June 26, 1951 |
| 2,640,398 | Manning | June 2, 1953 |
| 2,782,690 | Wildhaber et al. | Feb. 26, 1957 |
| 2,787,939 | Wildhaber | Apr. 9, 1957 |
| 2,889,754 | Lee | June 9, 1959 |

FOREIGN PATENTS

| | | |
|---|---|---|
| 1,091,359 | France | Oct. 27, 1954 |
| 482,514 | Germany | Oct. 3, 1929 |
| 215,390 | Great Britain | Sept. 18, 1924 |